United States Patent [19]
Ricketts

[11] Patent Number: 5,282,441
[45] Date of Patent: Feb. 1, 1994

[54] LARGE ANIMAL HANDLING CHUTE

[75] Inventor: Tod Ricketts, Springfield, Mo.

[73] Assignee: Animar Systems, Inc., Springfield, Mo.

[21] Appl. No.: 983,409

[22] Filed: Nov. 30, 1992

[51] Int. Cl.$^5$ .............................................. A61D 3/00
[52] U.S. Cl. ...................................... 119/724; 119/751
[58] Field of Search ............................ 119/98, 99, 103

[56] References Cited
U.S. PATENT DOCUMENTS

| | | | |
|---|---|---|---|
| 2,396,928 | 3/1946 | Parsons | 119/99 |
| 2,528,664 | 11/1950 | Niece | 119/99 |
| 2,804,046 | 8/1957 | Turner | 119/99 |
| 3,590,784 | 7/1971 | Fly | 119/103 |
| 3,941,095 | 3/1976 | Hamilton et al. | 119/103 |
| 3,960,113 | 6/1976 | Kratky | 119/99 |
| 4,162,685 | 7/1979 | Knappenberger | 119/103 |
| 4,195,595 | 4/1980 | Shimonovich | 119/103 |
| 4,214,555 | 7/1980 | Sawby | 119/103 |
| 4,567,854 | 2/1986 | Burns | 119/103 |

OTHER PUBLICATIONS

"Ten Ways to Make Cattle Processing More Efficient", sales brochure of Bowman Livestock Equipment of Council Grove, Kans.

*Primary Examiner*—Robert P. Swiatek
*Attorney, Agent, or Firm*—Litman, McMahon & Brown

[57] ABSTRACT

A large animal handling chute designed to accommodate an elephant includes a fixed wall assembly and an opposing, movable wall assembly. The movable wall assembly is selectively movable toward and away from the fixed wall assembly upon movable supports traversing a pair of top and a pair of bottom support rails. The movable wall is independently pivotable at each of the movable supports. Four leg straps, two body straps, and a body support flap are provided to secure the elephant within the chute, and the entire chute including the confined elephant is rotatable about a pivot support to make the elephant's feet and legs accessible to a handler. A floor is hinged to the fixed wall assembly and can be hydraulically lowered to a horizontal position once the chute is rotated. The lowered floor thus provides a convenient work platform for an animal handler or veterinarian.

29 Claims, 4 Drawing Sheets

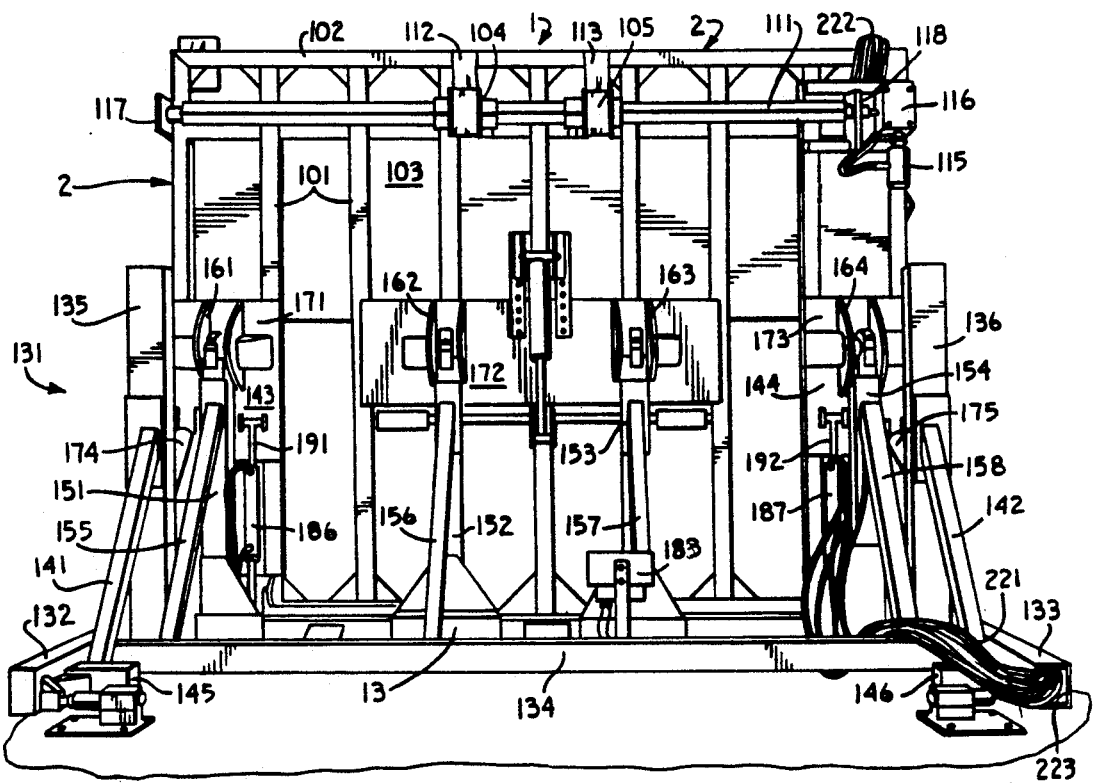
Fig.4.
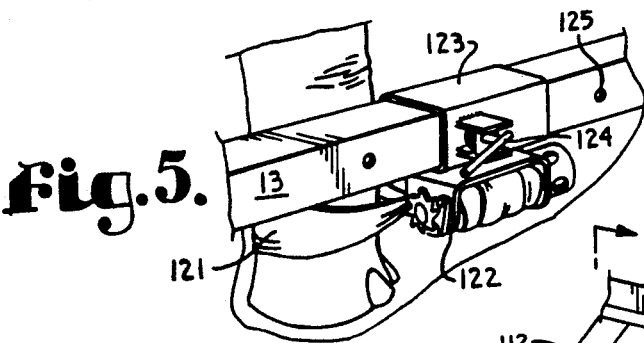
Fig.5.
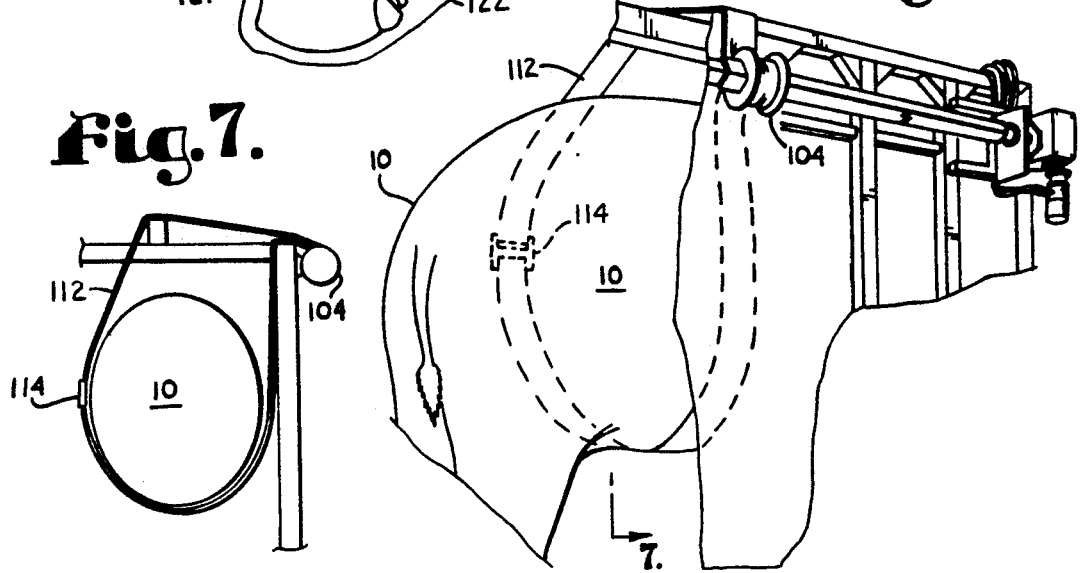
Fig.6.
Fig.7.

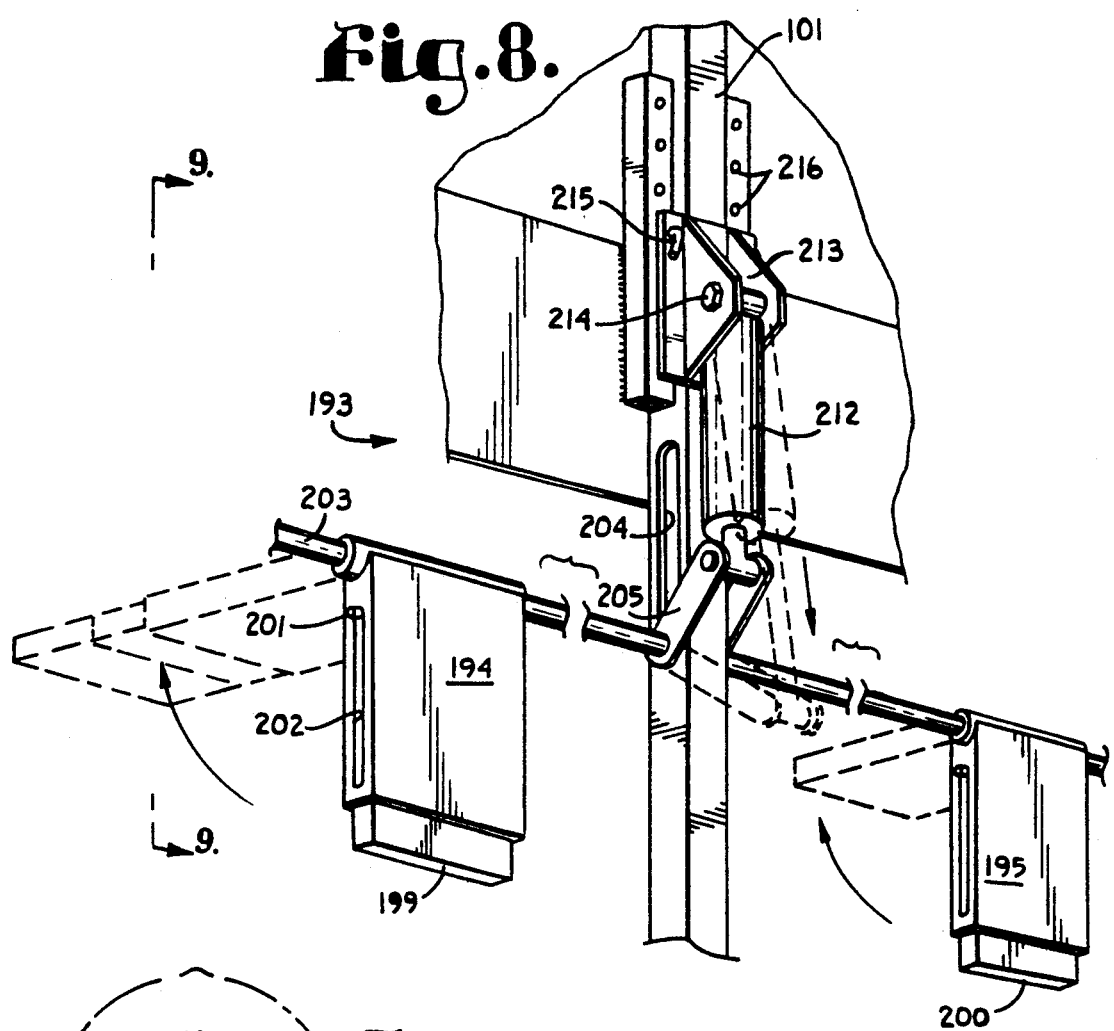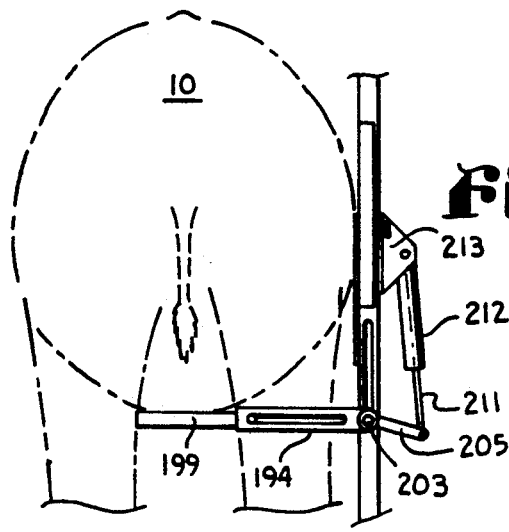

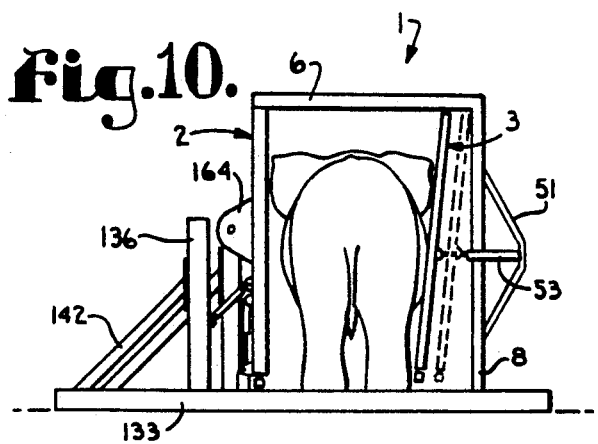
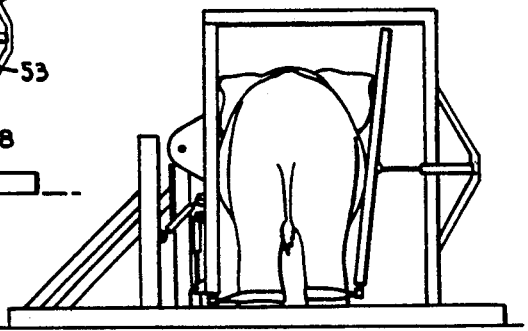
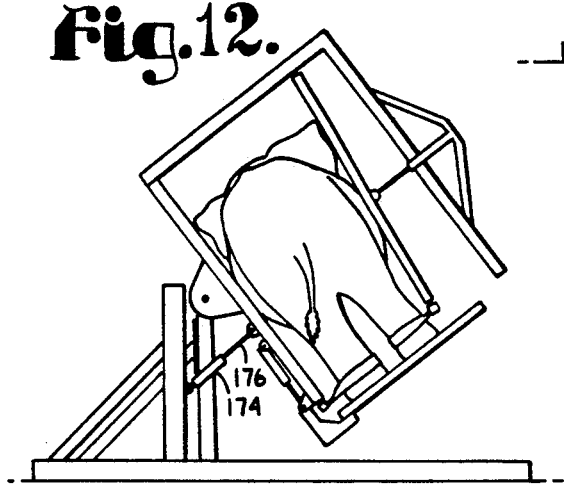
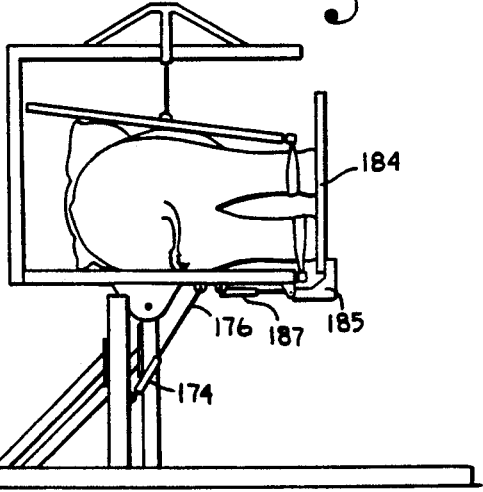
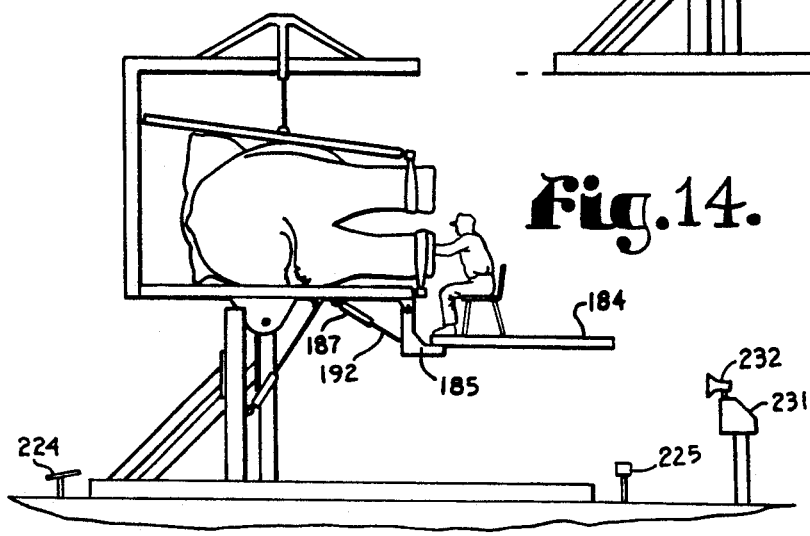

1

LARGE ANIMAL HANDLING CHUTE

BACKGROUND OF THE INVENTION

1. Field of the Invention

This invention is directed to a handling chute for a large animal such as an elephant or the like and more particularly to a handling chute in which an elephant can be securely held, strapped and hydraulically rotated to a position in which it is lying on its side to provide ready access to its legs and feet.

2. Description of the Related Art

In situations in which large animals, such as elephants or the like, require medical attention, including inoculations, hygienic care or other close quarter handling, an attending handler or veterinarian is in constant danger of serious injury by the animal, either intentional or inadvertent. This is particularly true if the attended animal is unrestrained. However, safely and securing restraining an elephant is not an easy task. In addition, it is sometimes necessary to place an elephant under general anesthesia for surgical procedures. To safely do so, the elephant must be safely and adequately supported to avoid injury while it is unconscious.

Numerous attempts have been made to create a safe and effective handling chute for large animal veterinary and hygienic care. Most such prior art attempts have been directed at cattle, horses and the like.

In a typical prior art device, a horse or cow is driven into a confining chute with two walls in which one or both walls are movable. Often a head gate is provided at one end to immobilize the animal's head. The movable wall(s) are then moved inwardly toward the confined animal, gripping it in a vise-like arrangement. Some movable wall systems have been made large enough to handle elephants or other large animals. Generally such systems have been simple stalls with one movable wall in which the animal is maintained in an upright position.

In some prior art devices for cattle or horses, the entire confining chute is then made pivotable about an axis which allows the animal to be rotated for enhanced access to the feet and legs, for example.

Such prior art handling chutes have generally not been suitable for very large animals such as elephants, for a number of reasons. The sheer size and weight of an elephant demands a large and very strong confining structure. In addition, an elephant's shape requires a confining structure which is flexible in its application, and an elephant's enormous strength requires a specialized immobilizing system. Ordinary head gates are not effective in holding an elephant's head, and an elephant's native intelligence makes it almost impossible to get it to enter a confining structure which is painful or particularly uncomfortable. A handling chute for an elephant should give a handler ready access to all parts of the animal's anatomy, while, at the same time, providing an elevated platform from which a handler can work. The pads of an elephant's feet also require specialized care and access. Another concern of elephant handlers is the trunk, which is extremely strong and can be used as a weapon by the elephant, again either intentionally or inadvertently. None of the prior art restraining chutes is designed for, nor are they readily adaptable for use with an elephant.

It is clear, then, that a real need exists for a handling chute designed to provide a handler or veterinarian with safe and convenient access to all portions of an elephant's anatomy. Such a chute must be extremely strong and durable, yet flexible in its operation, should provide a secure restraining system, should be capable of safely rotating the elephant to a position in which its feet are readily accessible, should protect the handlers from damage by an elephant's trunk, and, preferably, should provide a convenient, elevated platform for enhanced access.

SUMMARY OF THE INVENTION

In the practice of the present invention, a handling chute comprises a fixed rear wall assembly and a movable front wall assembly. An elephant walks into the chute between the fixed and the movable wall assemblies. The movable wall assembly can be selectively moved toward or away from the confined elephant along a pair of bottom and a pair of top support rails via four corresponding movable supports. Each end of the movable wall assembly is independently, hydraulically driven, and each of the movable supports is adapted to permit the wall to pivot about it independently of the other movable supports. With this arrangement, each end, and, in fact, each corner of the movable wall assembly can be independently moved toward or away from the fixed wall assembly to allow maximum flexibility. Within the movable wall assembly are three separate wall sections, each of which is pivotally attached at the bottom thereof to the bottom of the movable wall assembly, and each of which has a hydraulically driven cylinder with a telescoping arm attached between the top thereof and the top of the movable wall assembly. The top of each wall section is thus independently adjustable toward or away from the confined animal. Within each wall section are a plurality of gates which can be independently opened and closed to allow access to each portion of that side of the elephant. A floor is arranged beneath the confined elephant, and four leg straps are provided, with two of the leg straps positionable at any point along the bottom of the movable wall assembly and two more positionable at any point along the bottom of the fixed rear wall assembly. A pair of adjustable body straps are positioned along the top of the rear fixed wall assembly, with a motor driven shaft arranged to tighten or loosen the body straps around the elephant. The entire confining chute, including the rear fixed wall assembly, the front movable wall assembly, the top and bottom support rails and the floor, is hydraulically pivotable as a unit about an axis which is centered on the rear fixed wall assembly at approximately the center of gravity of the elephant and confining chute. This permits the elephant to be rotated to a position in which the elephant is lying generally on its side and the feet and legs are safely accessible by a handler. The floor is connected to the rear fixed wall assembly via a plurality of hinges, with a pair of hydraulic cylinders and telescoping pistons connected between the rear wall assembly and two of the floor hinges. Once the elephant is rotated to such a position, the floor can be hydraulically lowered by retracting the telescoping pistons. The floor is thus positionable in a horizontal position, in which it serves as a convenient support platform for the handler. One or more hydraulically operated body supporting flap assemblies can be arrayed along the rear fixed wall assembly to provide additional support for the elephant. These flap assemblies can be positioned for supporting the torso, can be placed beneath the elephant's head to protect handlers from the trunk, or can be used as a positioning aid to prevent a confined animal from backing up within the chute. The entire structure, including rotatable chute and supporting pivot structure can be mounted on a plurality of strain gauges so that the elephant can be conveniently weighed as it is being handled.

OBJECTS AND ADVANTAGES OF THE INVENTION

The principle objects and advantages of the present invention include: to provide a handling chute for a large animal such as an elephant or the like; to provide such a handling chute which safely confines the elephant to permit close quarter handling thereof and/or safe general anesthesia of a confined elephant; to provide such a chute which permits ready access to all portions of a confined elephant's anatomy; to provide such a chute which includes a fixed wall assembly and a movable wall assembly, each end of the movable wall assembly being independently movable toward and away from the fixed wall assembly along a plurality of support rails; to provide such a chute which includes a plurality of securing straps designed to reliably secure the feet and the body of the confined elephant; to provide such a chute in which the movable wall assembly, the fixed rails, the rear wall and a floor are rotatable as a unit to permit access to the elephant's feet and legs; to provide such a chute in which the floor is hydraulically operated such that it can be dropped into a horizontal position, after the chute is rotated, to provide a convenient elevated work platform for a handler or veterinarian; to provide such a chute in which one or more body securing flap assemblies can be extended from the rear wall assembly to provide additional support for a confined elephant and/or protection for the handlers from the elephant's trunk; and to provide such a handling chute which is particularly well suited for its intended use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a rear plan view of the handling chute.

FIG. 5 is an enlarged fragmentary view illustrating a leg strap mechanism.

FIG. 6 is a fragmentary rear perspective view of the handling chute with a body strap being cinched about an elephant.

FIG. 7 is a reduced, partially schematic, cross-sectional view of an elephant encircled by the body strap of FIG. 6, taken along line 7—7 of FIG. 6.

FIG. 8 is an enlarged, fragmentary view of an optional body support flap assembly.

FIG. 9 is a reduced, partially schematic, cross-sectional view of an elephant being supported by the body support assembly of FIG. 8, and taken along line 9—9 of FIG. 8.

FIG. 10 is a reduced, partially schematic end plan view of the handling chute with an elephant positioned therein and the movable wall assembly being pressed against the elephant's side.

FIG. 11 is a reduced, partially schematic end plan view of the handling chute with an elephant positioned therein, the movable wall assembly pressed against the elephant's side, and the elephant secured by the body and leg straps.

FIG. 12 is a reduced, partially schematic end plan view of the handling chute with an elephant positioned therein, the movable wall assembly pressed against the elephant's side, the elephant secured by the body and leg straps, and the handling chute being rotated.

FIG. 13 is a reduced, partially schematic end plan view of the handling chute with an elephant positioned therein, the movable wall assembly pressed against the elephant's side, the elephant secured by the body and leg straps, and the handling chute rotated to a final locked position.

FIG. 14 is a reduced, partially schematic end plan view of the handling chute with an elephant positioned therein, the movable wall assembly pressed against the elephant's side, the elephant secured by the body and leg straps, the handling chute rotated to a final locked position, and the floor hydraulically positioned in a horizontal work position, as well as an optional safety interlock system.

DETAILED DESCRIPTION OF THE INVENTION

I. Introduction and Environment

Figures 1, 2, 3:
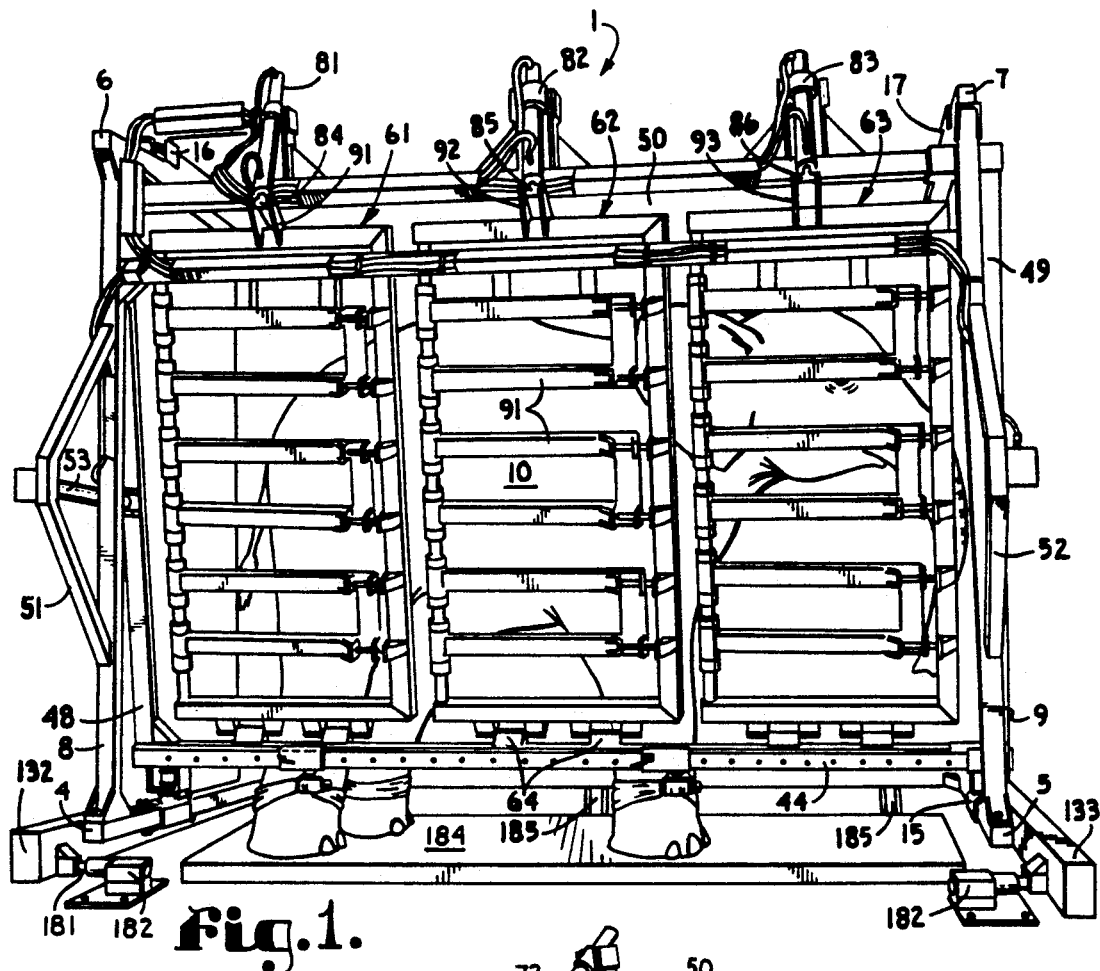
FIG. 1 is a perspective view of a large animal handling chute in accordance with the invention.
FIG. 2 is a fragmentary perspective view of the handling chute, showing a hydraulically operated movable wall assembly being moved into a confining position and with an individual access gate opened.
FIG. 3 is an enlarged, fragmentary view of a movable wall assembly pivotable support assembly.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail the reference numeral 1 generally designates a large animal handling chute with a rear, fixed wall assembly 2 and a front, movable confinement wall assembly 3. A pair of bottom support rails 4 and 5 are rigidly connected to a base member 13 of the rear wall assembly 2, a top support 6 is connected to the bottom support rail 4 via an upright support member 8 while the bottom support member 5 is connected to a top support rail 7 via a matching upright support member 9. The movable confinement wall assembly 3 is connected to the top and bottom support rails 4, 5, 6, and 7, via a like plurality of movable wall supports 14, 15, 16 and 17, respectively. An elephant 10 is shown confined between the movable confinement wall assembly 3 and the fixed wall assembly 2.

II. Handling Chute

Each of the movable supports 14-17 are identical, with only the support 14 illustrated in FIG. 3. The support 14 comprises a rectangular sleeve 21 which surrounds the bottom support rail 4. The tops of each of the support rails 4, 5, 6 and 7 are formed from a channel member 22 which provides an inverted V shape while the bottoms are formed from a channel member 23 which provides an upright V shape. A plurality of V rollers 24-27 in the movable support 14 engage the top and bottom V's of the support rails 4 such that the support 14 is movable therealong. An upwardly extending circular sleeve 33 is welded to the top of the rectangular sleeve 21, the sleeve 33 ending in a circular flange 34. An internal shaft 35 extends upward through the sleeve 33, through a pair of circular bores 41 and 42 (shown in phantom) in a support member 43, and into a base frame member 44 of the movable confinement wall assembly 3. The support member 43 is welded to the base frame member 44. A flanged collar 45 is sandwiched within the support member 43 and an additional collar 46 is positioned above a cross member 47 in the support member 43. The support member 43, and thus the movable confinement wall assembly 3, attached thereto, is thus pivotable about the shaft 35. With this arrangement, each corner of the movable confinement wall assembly 3 is independently pivotable about the corresponding movable support 14-17. Bearing races (not shown) may be provided between the flanges in the collar 45 and the collar 46 as well as between the collar 45 and the flange 34.

The movable confinement wall assembly 3 also includes a pair of upright frame members 48 and 49, connected to a top frame member 50. A triangularly shaped support 51 is attached to the upright frame member 8 and a matching triangular support 52 is attached to the upright frame member 9. A corresponding pair of hydraulically operated cylinders 53 and 54 are attached to the respective triangular supports 51 and 52. Each of the cylinders 53 and 54 includes a corresponding telescoping piston 55, as shown in FIG. 2, with each piston 55 attached at one end to a corresponding upright frame member 48 or 49 of the movable confinement wall assembly 3. As one of the telescoping pistons 55 is extended, the corresponding upright frame member 48 or 49 is urged toward the confined elephant 10. As shown in FIG. 2, each piston 55 is connected to the respective upright frame member 48 or 49 at a pivot connection point 56 which is lower than the center of the connected upright frame member 48 or 49. Consequently, as each piston 55 is extended, the bottom portion of the movable confinement wall assembly 3 is advanced toward the confined elephant 10 ahead of the top portion.

The movable confinement wall assembly 3 also includes a plurality of pivotable wall sections 61-63. Each of the pivotable wall sections 61-63 is pivotally attached to the base frame member 44 via a pair of hinges 64. A plurality of hydraulically operated cylinders 71, 72 and 73, are each pivotally attached to the top frame member 54. Each of the cylinders 71-73 includes a telescoping piston, 74-76, respectively, and each telescoping piston 74-76 is connected to the top of a respective one of the wall sections 61-63 at a respective pivot support 81-83. As shown in FIG. 2, each of the wall sections 61-63 can be selectively pivoted outward, as is section 62, in the direction of the illustrating arrow, via the associated telescoping piston 75. As the movable confinement wall assembly 3 is advanced toward the elephant 10, each of the pivotable wall sections 61-63 can be simultaneously pivoted outward to provide an appropriately angled wall surface to contact the elephant 10.

Furthermore, each wall section 61-63 includes a plurality of gates 91. Referring to FIG. 2, each gate 91 is attached at one end to the corresponding pivotable wall section 61-63 via a pair of hinges 92 and 93, and each gate 91 can be locked closed via a pair of pins 94 inserted in corresponding pin apertures 95 in the gates 91 and into a slot (not shown) in a pair of corresponding pin receiving flanges 96 mounted on the respective wall section 61-63.

The fixed rear wall assembly 2 is best illustrated in FIG. 4. The rear wall assembly 2 comprises a plurality of upright supports 101 extending between the base frame member 13 and a top frame member 102. A steel plate 103 is attached to the inside of the upright supports 101. A pair of body strap reels 104 and 105 are attached to a square rod 111. A corresponding pair of body straps 112 and 113 are wound around the reels 104 and 105. Each of the reels 104 and 105 can be positioned at any desired point along the rod 111. FIGS. 6 and 7 show the elephant 10 with the body strap 112 encircling it. A buckle 114 is provided to secure the two ends of the strap 112, both ends of which are wrapped about the reel 104. As the two ends are connected via the buckle 114, an orbital motor 115 is started, driving a gear box 116, which turns the rod 111, retracting both ends of the strap 112 and cinching it against the elephant 10. The straps 112 and 113 can be constructed of webbed nylon or the like, and can be padded for comfort. The rod 111 is rotatably mounted to the rear wall assembly 2 via a pair of support plates 117 and 118.

Four leg straps, such as the strap 121 shown in FIG. 5, are provided for securing the feet of the elephant 10. Each leg strap 121 is wrapped about a ratcheted strap reel 122 positioned beneath a rectangular sleeve 123. A spring loaded pin 124 is provided to lock the sleeve 123 in a selected position on the base frame member 44 or 13 of the movable confinement wall assembly 3 or the fixed wall assembly 2, respectively. A plurality of pin receiving apertures 125 are provided in each of the base members 44 and 13 so that each of the sleeves 123 can be securely positioned at any desired point along the corresponding base member.

Referring again to FIGS. 1 and 4, a base frame assembly 131 includes a pair of horizontal legs 132 and 133 connected by a cross support member 134. A pair of vertical cylinder support members 135 and 136 extend upwardly from the cross support member 134. The vertical cylinder supports 135 and 136 are braced by a pair of angled braces 141 and 142 extending between a corresponding pair of support plates 143 and 144 on the vertical supports and a pair of extension arms 145 and 146 extending from the legs 132 and 133. Four additional vertical supports 151-154 are similarly braced via respective angled braces 155-158, respectively. The vertical supports 151-154, respectively, from left to right in FIG. 4, collectively provide a pivot axis for a like plurality of pivot mounts 161-164 connected to a series of steel plates 171, 172, and 173 welded to various upright members 101 of the rear wall assembly 2. A pair of hydraulically operated cylinders 174 and 175, each with a corresponding telescoping piston 176 (FIGS. 12-14), are connected between the steel plates 171 and 173, and the vertical cylinder supports 135 and 136, respectively. As the telescoping pistons 176 and 177 are extended, the entire rear wall assembly 2 along with the support rails 4-7 and the movable confinement wall assembly 3 are rotated as a unit about the pivot mounts 161-164, as is shown in FIGS. 12 and 13.

The horizontal legs 132 and 133 are suspended above a support surface by a plurality of support arms 181 which extend into a like plurality of strain gauges 182. The strain gauges 182 are connected to a scale calculator and readout 183 (FIG. 4) for weighing the confined elephant 10.

A floor 184 is attached to the base frame member 13 of the rear wall assembly 2 via a plurality of hinges 185. An additional pair of hydraulic cylinders 186 and 187, along with corresponding telescoping pistons 191 and 192, extend between the steel plates 171 and 173, respectively, and two of the hinges 185. After the confined elephant 10 has been rotated to a nearly prone position, as shown in FIG. 13, the pistons 191 and 192 can be retracted, causing the hinges 185 to pivot, thus lowering the floor 184 to a horizontal working platform position, as shown in FIG. 14, which affords an attendant convenient and safe access to the legs, feet and the underneath side of the elephant 10. Further retraction of the pistons 191 and 192 cause the floor 184 to be lowered to a vertical position (not shown) out of the way, placing it completely out of the way.

Referring to FIGS. 4 and 8, additional support for the confined elephant 10 is provided via a torso flap assembly 193. The flap assembly 193 comprises a pair of flaps 194 and 195, each of which includes a telescoping extension member 199 and 200, respectively. Each of the extensions members 199 and 200 has a guide pin 201 incorporated thereon, which guide pins 201 operate within a respective slot 202 in the associated flap 199 or 200. The flaps 194 and 195 are rigidly connected to a support rod 203 which extends through a slot 204 in one of the vertical supports 101 in the rear wall assembly 2. The rod 203 is also connected to a pivot arm pair 205, which is, in turn, connected to a telescoping piston 211 of a hydraulic cylinder 212. The cylinder 212 is pivotally connected to the upright support 101 via a bracket 213 and a bolt 214. The bracket 213 can be adjusted vertically via a pair of pins 215, which extend through a selected one of a plurality of pin apertures 216. The flaps 194 and 195 can be adjustable along the support rod 203, and are rotated upward as the telescoping piston 211 is extended, as shown in phantom lines in FIG. 8. FIG. 9 shows the flaps 194 and 195 pivoted upward to support the torso of the elephant 10. It should be noted that additional flap assemblies 193 can be located along the rear wall assembly 2 to support the head and tail of the confined elephant 10, to aid in maneuvering the elephant, or to protect a handler from damage by a confined elephant's trunk.

Again referring to FIG. 4, two bundles of hydraulic cables and electrical wires 221 and 222 are illustrated, with the bundle 221 extending through a hollow recess 223 in the support leg 133. It should be noted that additional hydraulic cables and wires are provided where needed in the chute 1, but they have been omitted for convenience of illustration.

Referring to FIG. 14, a photoelectric emitter and sensor 224 and 225, respectively, are shown mounted on one side of the chute 1. When the photoelectric beam is broken, the sensor sends an alarm signal to a safety interlock and control system 231 and an associated horn 232. The safety interlock and control system 231 then stops all movement for a set time period, such as 5 seconds, and sounds the horn 232 as a warning. It should be noted that a plurality of such photoelectric sensors are provided on all sides of the chute 1 for purposes of safety.

III. Operation

The operation of the handling chute will now be described with reference to FIGS. 1-14, with particular emphasis on FIGS. 10-14. Initially, the telescoping pistons 55 of the hydraulic cylinders 53 and 54 are retracted, withdrawing the movable wall assembly 3 away from the fixed wall assembly 2. The elephant 10 is then urged into a position between the two wall assemblies 2 and 3, and the pistons are extended, urging the movable wall assembly 3 into contact with the elephant 10, as is shown in FIG. 10. As the movable wall assembly 3 is moved forward along the rails 4-7, the pivotable wall sections 61-63 can be pivoted outward so that the movable wall assembly 3 more closely follows the contours of the elephant. The body straps 112 and 113 and the leg straps 121 are then securely cinched about the elephant's torso and legs, respectively, as described above. If attention is to be directed to the sides of the elephant, selective ones of the gates 91 are opened to provide access to the desired area. However, if the elephant's feet or legs or the stomach or genital area must be accessed, or if the elephant 10 must be placed under a general anesthesia where it must be supported while unconscious, the elephant 10 must be rotated.

To do this, once the elephant 10 is securely held between the movable wall assembly 3 and the fixed wall assembly 2, and securely strapped into place via the body straps 112 and 113, and the leg straps 121, the flaps 194 and 195 and the extensions 199 and 200 are then elevated to provide further support for the elephant's torso, as shown.

Once the elephant 10 is so secured and supported, the telescoping pistons 176 of the hydraulic cylinders 174 and 175 are extended, causing the movable wall assembly 3, the fixed wall assembly 2, the floor 184, and the support rails 4-7 to be rotated as a unit with the confined elephant 10, as shown in FIGS. 12 and 13. The floor 184 can then be lowered to a horizontal working position, as shown in FIG. 14, to provide convenient access to the elephant's feet and legs. Should the handler need to access the belly or genital areas of the elephant 10, once the elephant 10 has been rotated to the position shown in FIGS. 13 and 14, the movable wall assembly 3 can be retracted slightly, spreading the elephant's legs apart to enhance the accessibility of these areas. Thus, safe and convenient access is available to any portion of the elephant 10 except the side which is against the fixed wall assembly 2. Of course, this side can be accessed by reversing the elephant 10 within the handling chute 1.

In a preferred embodiment of the invention, a plurality of safety interlocks are performed by the safety interlock system 231 to constrain the various hydraulic cylinders 53, 54, 71, 72, 73, 174, 175, 186, 187, and 212 to operate in a certain sequence. Examples of such interlocks include: (1) the floor cylinders 186 and 187 cannot rotate until the chute rotating cylinders 174 and 175 have been extended to the position of FIG. 13; (2) similarly, the chute 1 cannot be rotated back to a vertical position until the floor 184 has been raised to the position shown in FIG. 13; and (3). The photoelectric emitters and sensors 224 and 225 form a grid about the chute 1. The safety interlock system 231 causes all cylinders in the chute 1 to lock up and the horn 232 to sound for 5 seconds when personnel are detected in a danger zone Other safety interlocking sequences can be employed as needed.

It is to be understood that while certain forms of the present invention have been illustrated and described herein, it is not to be limited to the specific forms or arrangement of parts described and shown.

What is claimed and desired to be secured by Letters Patent is as follows:

1. A large animal handling chute comprising:
   (a) a fixed wall means; and
   (b) a movable confinement wall means, said movable confinement wall means comprising
      (i) a support frame means including a pair of bottom support rails and a pair of top support rails, each of said bottom support rails being connected to a corresponding top support rail by a separate upright support;
      (ii) a movable confinement wall attached to each of said top and bottom support rails via a corresponding plurality of movable attachment points, said movable confinement wall being movable toward and away from said fixed wall along said support rails; and
      (iii) means for selectively moving said movable confinement wall along said support rails, said means for moving including a pair of hydraulically operated cylinders, each with telescoping pistons, each of said hydraulic cylinders being attached to a different one of said upright supports, and each of said telescoping pistons being attached to a respective end of said movable confinement wall whereby either end of said movable confinement wall can be independently moved along said top and bottom support rails by the extension or retraction of the respective telescoping piston.

2. An invention as in claim 1, wherein said movable attachment points each comprise:
   (a) a support movable along the corresponding support rail; and
   (b) a pivot mount attached to said movable support and to said movable confinement wall whereby said movable confinement wall is independently pivotable relative to each of said top and bottom support rails.

3. An invention as in claim 2, wherein:
   (a) the top surfaces of said support rails are shaped as an inverted V and the bottom surfaces of said support rails are shaped as an upright V; and
   (b) each of said movable supports comprises a rectangular sleeve which surrounds the respective support rail, and a plurality of V rollers attached to said sleeve and adapted to roll along the top and bottom surfaces of said corresponding rail.

4. An invention as in claim 1, wherein:
   (a) each of said telescoping pistons is connected to said respective movable wall end below the center thereof so that the bottom of said movable wall is urged toward said fixed wall means ahead of the top of said movable wall.

5. An invention as in claim 1, wherein:
   (a) said movable wall includes a plurality of vertically oriented pivotable wall sections, each of which can be independently pivoted toward or away from said fixed wall means.

6. An invention as in claim 5, wherein:
   (a) the bottom of each of said pivotable wall sections is attached to the bottom of said movable wall via a plurality of hinges;
   (b) the top of each of said pivotable wall sections is connected to one end of a respective telescoping piston of a hydraulic cylinder, with the other end of said cylinder being pivotally attached to the top of said movable wall; whereby
   (c) extension of said telescoping piston causes the top of the connected pivotable wall section to pivot outward, away from the top of the movable wall.

7. An invention as in claim 5, wherein:
   (a) each of said plurality of vertically oriented pivotable wall sections comprises a plurality of gates which can be individually swung opened or closed.

8. An invention as in claim 1, and further comprising:
   (a) a pivot support means;
   (b) said fixed wall assembly being pivotally attached to said pivot support means; and
   (c) means for pivoting said fixed wall assembly, and said movable wall assembly, along with an animal confined therebetween, to a position in which the animal is lying on its side with its feet and legs readily accessible to a handler.

9. An invention as in claim 8, wherein:
   (a) said pivot support means comprises a pair of stationary horizontal support legs oriented perpendicularly to said fixed wall means and a stationary cross support member extending between said pair of horizontal legs;
   (b) a pair of stationary upright cylinder support members;
   (c) a plurality of stationary vertical upright pivot support members, each of said pivot support members being pivotally attached near the center of said fixed wall means, said pivotal attachments collectively forming a pivot axis for said fixed wall means; and
   (d) said means for pivoting comprising a pair of hydraulic cylinders and telescoping pistons, each of which is connected between a respective one of said cylinder support members and said fixed wall means whereby extension of said telescoping pistons causes said fixed wall means, said confined animal and said movable wall means to rotate as a unit about said pivot axis.

10. An invention as in claim 9, and further comprising:
    (a) a floor means, said floor means being pivotally connected to said fixed wall means and being rotatable therewith;
    (b) at least one hydraulic cylinder and telescoping piston connected between said floor means and said fixed wall means; whereby
    (c) said floor means can be hydraulically lowered to a position in which it forms an approximately horizontal working platform when said animal is rotated to lie on its side.

11. A large animal handling chute as in claim 10, wherein:
    (a) said floor can be further lowered to a vertical position out of the way of a handler or veterinarian.

12. An invention as in claim 1, and further comprising:
(a) a hydraulically operated flap means connected to said fixed wall means,
(b) said flap means including at least one flap which is selectively pivotable between a retracted position in which it is generally parallel to said fixed wall means and a support position in which it is generally perpendicular to said fixed wall means.

13. An invention as in claim 12, wherein:
(a) said flap means includes a plurality of flaps; and
(b) each of said flaps includes a telescoping extension member which can be retracted into the corresponding flap when said flap is in the retracted position and extended outward from said flap when said corresponding flap is in the support position.

14. An invention as in claim 13, wherein:
(a) said flap means further includes a hydraulic cylinder attached to said fixed wall means; a telescoping piston of said hydraulic cylinder attached to a pivot arm which pivots about a point on said fixed wall means; and a rod attached to said pivot arm, said arm extending through a portion of said fixed wall means and adapted to be rotatable with the pivot arm; and
(b) each of said flaps is connected to rotate upward with said rod as said telescoping piston is extended.

15. An invention as in claim 14, wherein:
(a) said flaps are adjustable along said rod.

16. An invention as in claim 1, and further comprising:
(a) at least one body strap adapted to encircle the animal's body;
(b) a body strap reel positioned on the fixed wall assembly; and
(c) means for retracting said at least one body strap onto said reel to tighten the at least one body strap about the animal's body.

17. An invention as in claim 16, wherein:
(a) said body strap reel is attached to a shaft; and
(b) said means for retracting comprises a motor and gear drive attached to said shaft.

18. An invention as in claim 1, and further comprising:
(a) a plurality of leg straps, the position of each of which is adjustable along the base of the handling chute, and each of which is adapted to encircle a respective leg of said animal; and
(b) means for tightening each of said leg straps about the respective leg of said animal.

19. A large animal handling chute comprising:
(a) an adjustable confinement means for securely confining a large animal, said confinement means being rotatable about a pivot axis to a position in which the animal is lying on its side; and
(b) a floor means, said floor means being pivotally connected to said confinement means and being rotatable therewith;
(c) at least one hydraulic cylinder and telescoping piston connected between said floor means and said confinement means; whereby
(d) said floor means can be hydraulically lowered to a position in which it forms an approximately horizontal working platform when said animal is rotated to lie on its side.

20. A large animal handling chute as in claim 19, wherein:
(a) said floor can be further lowered to a vertical position out of the way of a handler or veterinarian.

21. A large animal handling chute comprising:
(a) an adjustable confinement means for securely confining a large animal;
(b) a hydraulically operated flap means connected to said confinement means,
(c) a separate floor; and
(d) said flap means includes at least one flap which is selectively pivotable between a retracted position in which it is generally parallel to the side of the confined animal and a support position in which it is generally perpendicular to the animal's side and positions beneath a portion of the animal's torso while the animal is standing on said floor.

22. An invention as in claim 21, wherein:
(a) said flap means includes a plurality of flaps; and
(b) each of said flaps includes a telescoping extension member which can be retracted into the corresponding flap when said flap is in the retracted position and extended outward from said flap when said corresponding flap is in the support position.

23. An invention as in claim 22, wherein:
(a) said flap means further includes a hydraulic cylinder attached to said confinement means; a telescoping piston of said hydraulic cylinder attached to a pivot arm which pivots about a point on said confinement means; and a rod attached to said pivot arm, said arm extending through a portion of said confinement means and adapted to be rotatable with the pivot arm; and
(b) each of said flaps is connected to rotate upward with said rod as said telescoping piston is extended.

24. A large animal handling chute for facilitating close handling of an elephant or the like, comprising:
(a) a fixed wall means; and
(b) a movable confinement wall means, said movable confinement wall means comprising
  (i) a support frame means including a pair of bottom support rails and a pair of top support rails, each of said bottom support rails being connected to a corresponding top support rail by a separate upright support;
  (ii) a movable confinement wall attached to each of said top and bottom support rails via a corresponding plurality of movable attachment points, said movable confinement wall being movable toward and away from said fixed wall along said support rails, each of said movable supports comprising a support movable along the corresponding support rail and a pivot mount attached to said movable support and to said movable confinement wall whereby said movable confinement wall is independently pivotable relative to each of said top and bottom support rails; and
  (iii) means for selectively moving said movable confinement wall along said support rails including a pair of hydraulically operated cylinders, each with telescoping pistons, each of said hydraulic cylinders being attached to a different one of said upright supports, and each of said telescoping pistons being attached to a respective end of said movable confinement wall whereby either end of said movable confinement wall can be independently moved along said top and bottom support rails by the extension or retraction of the respective telescoping piston;

(c) said movable wall comprising a plurality of vertically oriented pivotable wall sections, each of which can be independently pivoted toward or away from said fixed wall means, the bottom of each of said pivotable wall sections being attached to the bottom of said movable wall via a plurality of hinges, the top of each of said pivotable wall sections being connected to one end of a respective telescoping piston of a hydraulic cylinder, with the other end of said cylinder being pivotally attached to the top of said movable wall; whereby (d) extension of said telescoping piston causes the top of the connected pivotable wall section to pivot outward, away from the top of the movable wall;

(e) a pivot support means;

(f) said fixed wall assembly being pivotally attached to said pivot support means;

(g) means for pivoting said fixed wall assembly, and said movable wall assembly, along with an animal confined therebetween, to a position in which the animal is lying on its side with its feet and legs readily accessible to a handler;

(h) a floor means, said floor means being pivotally connected to said fixed wall means and being rotatable therewith;

(i) at least one hydraulic cylinder and telescoping piston connected between said floor means and said fixed wall means; whereby (j) said floor means can be hydraulically lowered to a position in which it forms an approximately horizontal working platform when said animal is rotated to lie on its side.

25. A large animal handling chute as in claim 24, wherein:

(a) said floor can be further lowered to a vertical position out of the way of a handler or veterinarian.

26. An invention as in claim 24, wherein:

(a) each of said telescoping pistons is connected to said respective movable wall end below the center thereof so that the bottom of said movable wall is urged toward said fixed wall means ahead of the top of said movable wall.

27. An invention as in claim 24, wherein:

(a) each of said plurality of vertically oriented pivotable wall sections comprises a plurality of gates which can be individually swung opened or closed.

28. An invention as in claim 24, wherein:

(a) said pivot support means comprises a pair of stationary horizontal support legs oriented perpendicularly to said fixed wall means and a stationary cross support member extending between said pair of horizontal legs;

(b) a pair of stationary upright cylinder support members;

(c) a plurality of stationary vertical upright pivot support members, each of said pivot support members being pivotally attached near the center of said fixed wall means, said pivotal attachments collectively forming a pivot axis for said fixed wall means; and (d) said means for pivoting comprising a pair of hydraulic cylinders and telescoping pistons, each of which is connected between a respective one of said cylinder support members and said fixed wall means whereby extension of said telescoping pistons causes said fixed wall means, said confined animal and said movable wall means to rotate about said pivot axis.

29. An invention as in claim 24, and further comprising:

(a) a hydraulically operated flap means connected to said fixed wall means, (b) said flap means including at least one flap which is selectively pivotable between a retracted position in which it is generally parallel to said fixed wall means and a support position in which it is generally perpendicular to said fixed wall means.

* * * * *